UNITED STATES PATENT OFFICE.

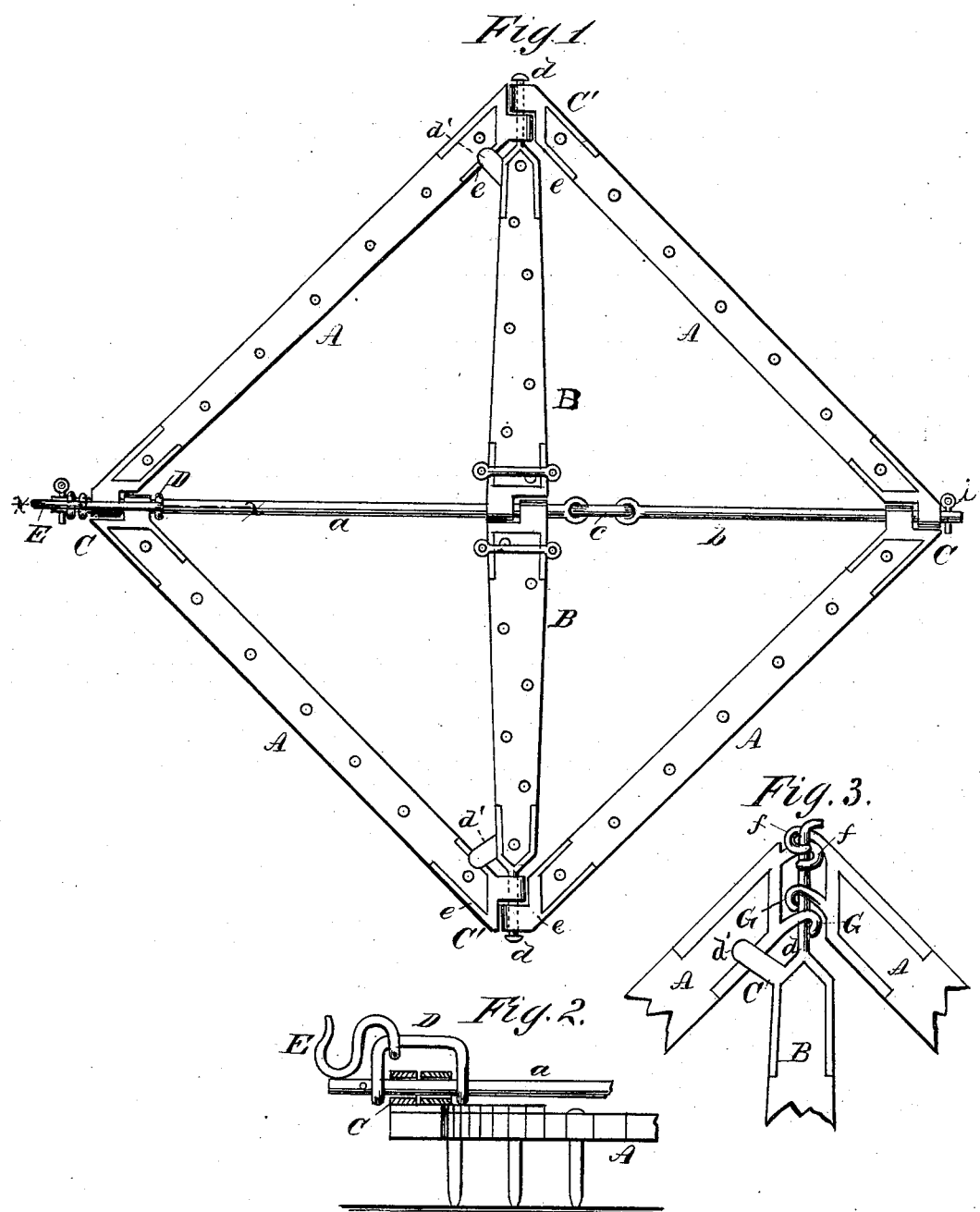

LYMAN NORTON, OF HARTFORD, NEW YORK.

IMPROVEMENT IN HARROWS.

Specification forming part of Letters Patent No. 199,988, dated February 5, 1878; application filed October 12, 1877.

*To all whom it may concern:*

Be it known that I, LYMAN NORTON, of Hartford, in the county of Washington and State of New York, have invented a new and Improved Harrow, of which the following is a specification:

Figure 1 is a plan view of my improved harrow. Fig. 2 is a detail view of one of the joints, taken in section on line $x$ $x$ in Fig. 1. Fig. 3 is a detail view of one of the hinge-joints.

Similar letters of reference indicate corresponding parts.

The invention is an improvement in the class of square harrows composed of a jointed frame.

The improvement relates to the construction and arrangement of parts, as hereinafter described and claimed.

In the drawing, A A are bars, which are connected by hinges to form a rectangular frame. The rods $a$ $b$, which are connected by a link, $c$, form the pivot of the hinges C of two opposite corners, and also of the jointed bar B, which extends across the frame at right angles to the rods $a$ $b$, and has upon its ends studs $d$, that form the pivots of the hinges C'.

Said hinges may be constructed as shown in Fig. 1; but the construction I prefer is to form hooks $f$ on the hinge-irons $e$, and to curve the outer ends of pivots $d$, as shown in Fig. 3, which permits the rear bars A to be detached therefrom at will, by first withdrawing the spring-key $i$ from rod $b$, then slipping the rear ends of said bars off from the rod, and, lastly, slipping their forward hooked ends off from the pivots $d$.

The several bars A B are provided with teeth in the usual way, and the outer ends of the jointed bar B have fingers $d'$, which rest upon the rear ends of the forward bars A A. The function of these fingers is to prevent turning or torsion of the bar B, due to the leverage of its teeth acting against the soil, and thus partially relieve the hinges of the bar B of strain, and likewise prevent the teeth of said bar inclining rearward in consequence of such torsion.

Having thus described my invention, I claim as new and desire to secure by Letters Patent—

1. In a harrow, the combination of the jointed toothed cross-bar B, having the fingers $d'$, the rods $a$ $b$, and the jointed toothed front and rear bars A A, all combined as shown and described.

2. In a harrow, the combination of the bars A A, having hooks $f$ $f$, the cross-bar B, having curved pivots $d$, the rods $a$ $b$, and key $i$, as shown and described, whereby the said parts are adapted to be readily connected and detached, as shown and described.

LYMAN NORTON.

Witnesses:
 E. B. NORTON,
 JOHN B. NORTON.